United States Patent [19]

Inoue

[11] Patent Number: 4,812,036
[45] Date of Patent: Mar. 14, 1989

[54] STRESS EVALUATION APPARATUS
[75] Inventor: Yasuo Inoue, Hyogo, Japan
[73] Assignee: Mitsubishi Denki Kabushiki Kaisha, Tokyo, Japan
[21] Appl. No.: 132,618
[22] Filed: Nov. 23, 1987
[30] Foreign Application Priority Data
  Jul. 8, 1987 [JP] Japan .................. 62-171606
[51] Int. Cl.$^4$ .......... G01B 11/16; G01J 3/44; G01N 21/65
[52] U.S. Cl. .................. 356/32; 356/301
[58] Field of Search ............... 356/32, 301
[56] References Cited
U.S. PATENT DOCUMENTS
  4,643,950 2/1987 Oqura et al. ............ 428/446

OTHER PUBLICATIONS

T. Katoda et al., "Character of semiconductors by Laser-Raman Spectroscopy", Univ. of Tokyo, Oct. 3, 1980.
T. R. Hart et al., "Temperature Dependency of Raman Scattered in Silicon", Phys. Review B, Aug. 4, 1969, pp. 638-642.
R. TSU et al., "Temperature Dependency of Silicon Raman Lines", Appl. Phys. Lett., Dec. 1, 1982.

Primary Examiner—F. L. Evans
Attorney, Agent, or Firm—Lowe, Price, LeBlanc, Becker & Shur

[57] ABSTRACT

A stress evaluation apparatus for evaluating stress existing in a substance by difference between peak wave numbers of Raman spectra of scattered light comprises a light source for emitting excitation light, an entrance optical system for guiding the excitation light to measuring points of a substance to be evaluated, a scatter optical system for focusing scattered light from the measuring points, a spectroscope for spectro-analyzing the scattered light, a detector for detecting Raman spectra of the spectro-analyzed scattered light, an output controller for changing temperatures of the measuring points and a microcomputer for measuring peak wave numbers of the Raman spectra and statistically processing the same to thereafter obtain a peak wave number at a prescribed reference value. The output controller is adapted to change the temperatures of the measuring points of the substance to be evaluated. A plurality of peak wave numbers are measured by the microcomputer as those varied with temperature change of each measuring point, and the measured values are statistically processed per measuring point. Thereafter the microcomputer decides relation between temperature change of each measuring point and the variation of the peak wave numbers, thereby to obtain the peak wave number at the prescribed reference value.

7 Claims, 9 Drawing Sheets

STRESS EVALUATION APPARATUS

BACKGROUND OF THE INVENTION

1. Field of the Invention

The present invention relates to a stress evaluation apparatus for evaluating the physical property of a substance such as semiconductor and more particularly, it relates to a stress evaluation apparatus for evaluating internal stress existing in the substance.

2. Description of the Prior Art

In a conventional method of evaluating stress of a semiconductor member or the like which is manufactured through a process involving thermal expansion and internally provided with thermal stress, employed is a stress evaluation apparatus such as that disclosed in "Applied Physics", The Japan Society of Applied Physics, Vol. 50, No. 1, 1981; "Characterization of Semiconductors by Laser-Raman Spectroscopy" p. 69.

FIG. 1 is a schematic block diagram showing a conventional stress evaluation apparatus for measuring the Raman spectrum of scattered light.

Referring to FIG. 1, a light source 1 supplys excitation light such as Ar+ laser beam or He-Ne laser beam. Excitation light 9 supplied from the light source 1 is reflected by a mirror 10, and converged by a lens 11a on a measuring point of a substance 3 to be evaluated. Scattered light 12 from the measuring point of the substance 3 to be evaluated is converged by an another lens 11b, and spectro-analyzed by a spectroscope 13 such as a double monochromator. Spectro-analyzed light is detected by a detector 14, inputted in a microcomputer 15, and transmitted to a recorder 16.

In the conventional stress evaluation apparatus of the above structure, the Raman spectrum is measured in the following manner: The excitation light 9 supplied from the light source 1 is changed in direction by the mirror 10 and focused by the lens 11a, to be converged on/applied to the measuring point of the evaluated substance 3. The scattered light 12 from the measuring point of the evaluated substance 3 passes through the lens 11b, to be converged on an entrance slit of the spectroscope 13. The light is spectro-analyzed by the spectroscope 13 so that the Raman spectrum thereof is detected by the detector 14, to be inputted in the microcomputer 15 as an electric signal and stored in the same. Then the electric signal is subjected to data processing by the microcomputer 15 and transmitted to the recorder 16, which in turn records the Raman spectrum as a waveform or a peak wave number thereof.

Measurement of the Raman spectrum through the aforementioned apparatus is now described with reference to a flow chart. FIG. 2 is a flow chart showing conventional Raman spectrum measurement processing.

A substance to be evaluated is set at a step 601 and an optical system including lenses, mirror etc. is adjusted at a step 602, while conditions for Raman spectrum measurement are set at a step 603. Then, the Raman spectrum of light scattered from the evaluated substance is measured at a step 604. Description is now made on the routine of the Raman spectrum measurement processing with reference to another flow chart.

FIG. 3A is a flow chart showing a spectrum measurement routine in case of employing a photomultiplier as the detector 14.

First, the wave number of a spectroscope is set at a measurement start wave number $\omega_1$ at a step 701. Referring to a step 702, Raman scattering intensity corresponding to the wave number is measured. In this case, intensity of Raman scattered light is converted into a voltage signal by the photomultiplier, to be measured. At a step 703, data on the Raman scattering intensity thus obtained and the set wave number of the spectroscope are transferred to a microcomputer. Referring to a step 704, these data are A-D converted in the microcomputer to be stored in a memory as digital signals. At a step 705, the wave number of the spectroscope is compared with a measurement end wave number $\omega_2$, so that the wave number of the spectroscope is increased by $\Delta\omega$ at a step 706 if the same is smaller than the measurement end wave number $\omega_2$. Measurement of Raman scattering intensity corresponding to each wave number is repeated as shown in FIG. 3B until the wave number of the spectroscope exceeds the measurement end wave number $\omega_2$, to be stored in the memory of the microcomputer as a digital signal. When the wave number of the spectroscope exceeds the measurement end wave number $\omega_2$, the process is advanced to processing as shown in FIG. 2. At a step 605, a spectral waveform is outputted to a recorder on the basis of the data stored in the memory. Thereafter a peak wave number is read from the outputted spectral waveform at a step 606. Although the peak wave number is read from the recorded spectral waveform by an operator, the peak wave number value may be calculated by the microcomputer to be outputted to the recorder.

Description is now made on a method of evaluating internal stress existing in a substance from the Raman spectrum measured in the aforementioned manner. Raman scattered light results from excitation light striking the evaluated substance and partially losing its energy as vibration energy for component atoms and molecules etc. of the substance, to be different in wavelength from the original excitation light. The energy variation corresponds to the energy of lattice vibration and molecule vibration of the evaluated substance, and depends on stress existing therein. This variation corresponds to change in wave number in a peak of the measured Raman spectrum. FIG. 4 shows such a phenomenon with respect to silicon, for example. Referring to FIG. 4, a one-dot chain line 80 denotes the peak wave number of the Raman spectrum of single crystal silicon having no stress, which peak wave number is 520.5 $cm^{-1}$. However, in case of silicon internally having stress such as SOI (silicon on insulator: polysilicon deposited on silicon oxide) structure recrystallized by irradiation of laser beam, the peak number of its Raman spectrum as measured is shifted to a lower wave number side as shown by a solid line 81. This is because tensile stress exists in the SOI structure. Further, compressive stress exists in SOS (silicon on sapphire), which is polysilicon deposited on a sapphire substrate, and hence the peak wave number thereof is shifted to a higher wave number side as shown by a dotted line 82.

Thus, stress existing in a substance is evaluated through the fact that the stress corresponds to variation in peak wave number of the Raman spectrum.

As hereinabove described, stress existing in a substance is generally evaluated through difference between peak numbers of Raman spectra of a substance having no stress and the same substance internally having stress. However, such a value is influenced not only by the value of the stress but also by temperature difference in the substance. The results of measurement of relation between the peak wave numbers of Raman bands of silicon samples and sample temperatures are described in Physical Review B, Vol. 1, No. 2, pp. 638-642 (1970): "Temperature Dependence of Raman Scattering in Silicon" and Applied Physics Letters, Vol. 41(11), pp. 1016-1018 (1982): "Temperature Dependence of Silicon Raman Lines". For example, when the output power of excitation light applied to the same measuring point of an evaluated substance is changed, the peak wave number of the measured Raman spectrum is varied as shown in FIG. 5. This is because the temperature of the evaluated substance is varied with the output power of the excitation light. Such a phenomenon may occur in case of evaluating a substance having sectional structure as shown in FIG. 6, even if excitation light of the same output power is employed. When a silicon thin film 101 is irradiated with excitation light, temperature rise by the irradiation is increased since a silicon oxide film 102 has low thermal conductivity. When a silicon substrate 103 is irradiated with the excitation light of the same output power, heat by the irradiation is diffused in the interior of the silicon substrate 103 and hence temperature rise thereof is small as compared with that of the silicon thin film 101. Therefore, even if the silicon thin film 101 internally has stress of the same level as the silicon substrate 103, difference is caused in peak wave numbers of the Raman spectra employed for stress evaluation since the two members are different in temperature rise by irradiation from each other.

SUMMARY OF THE INVENTION

The present invention has been proposed to overcome the aforementioned disadvantage, and an object thereof is to provide a stress evaluation apparatus which can correct variation of peak wave numbers of Raman spectra caused by temperature difference in measuring points of a substance to be evaluated, in order to evaluate stress in high accuracy.

The stress evaluation apparatus according to the present invention is adapted to evaluate stress existing in a substance by difference between peak wave numbers in Raman spectra of scattered light. The inventive stress evaluation apparatus comprises:

(a) a light source for emitting excitation light;

(b) an entrance optical system for guiding the excitation light to measuring points of a substance to be evaluated;

(c) a scatter optical system for focusing scattered light from the measuring points;

(d) scattered light measuring means for measuring peak wave numbers in Raman spectra of the scattered light;

(e) temperature change means for changing temperatures of the measuring points;

(f) statistic processing means for statistically processing a plurality of measured values of the peak wave number varied with temperature change of each measuring point; and (g) arithmetic means for deciding relation between the temperature change of the measuring point and the variation in peak wave number on the basis of statistic values calculated by the statistic processing means to obtain a peak wave number at a prescribed reference value.

The temperature change means in the present invention is adapted to change the temperatures of the measuring points of the evaluated substance. Since a plurality of peak wave numbers are measured as those varied with temperature change of each measuring point, the measured values are statistically processed per measuring point. Relation between temperature change of the measuring point and the variation in peak wave number is decided by the values statistically processed per measuring point. Thus, the peak wave number at the prescribed reference value can be obtained by the said relation. Consequently, the obtained peak wave number can be employed for stress evaluation as data released from influence by temperature change of the measuring point.

According to the present invention, a plurality of Raman spectra of the substance to be evaluated are measured at different temperatures per measuring point to perform statistic/arithmetic processing for eliminating influence exerted by variation in peak wave number caused by temperature change, thereby to obtain data through which stress can be evaluated in high accuracy.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 7:
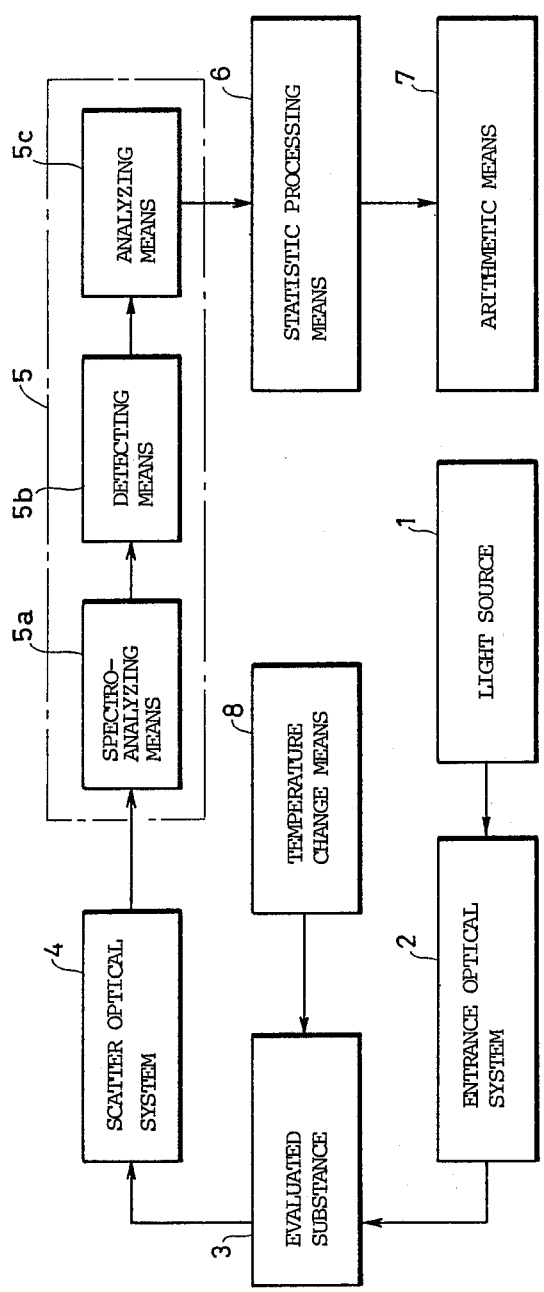
FIG. 7 is a general block diagram functionally showing a stress evaluation apparatus according to an embodiment of the present invention.

FIG. 7 is a general block diagram functionally showing an embodiment of a stress evaluation apparatus according to the present invention. As obvious from FIG. 7, excitation light supplied from a light source 1 passes through an entrance optical system 2 to be applied on a substance 3 to be evaluated. The light scattered by the evaluated substance 3 is converged by a scatter optical system 4, to be measured by scattered light measuring means 5. The scattered light measuring means 5 is formed by spectro-analyzing means 5a, detecting means 5b and analyzing means 5c. The scattered light is spectro-analyzed by the spectro-analyzing means 5a to be detected as a Raman spectrum by the detecting means 5b, and the analyzing means 5c analyzes the same to obtain the peak wave number of the Raman spectrum. On the other hand, temperature change means 8 is adapted to change the temperature of a measuring point of the evaluated substance 3. Relation between the temperature change and variation of the peak wave number obtained by the analyzing means 5c is statistically processed by statistic processing means 6, so that the relation is decided and the peak wave number at a prescribed reference value is obtained by arithmetic means 7.

Figure 8:
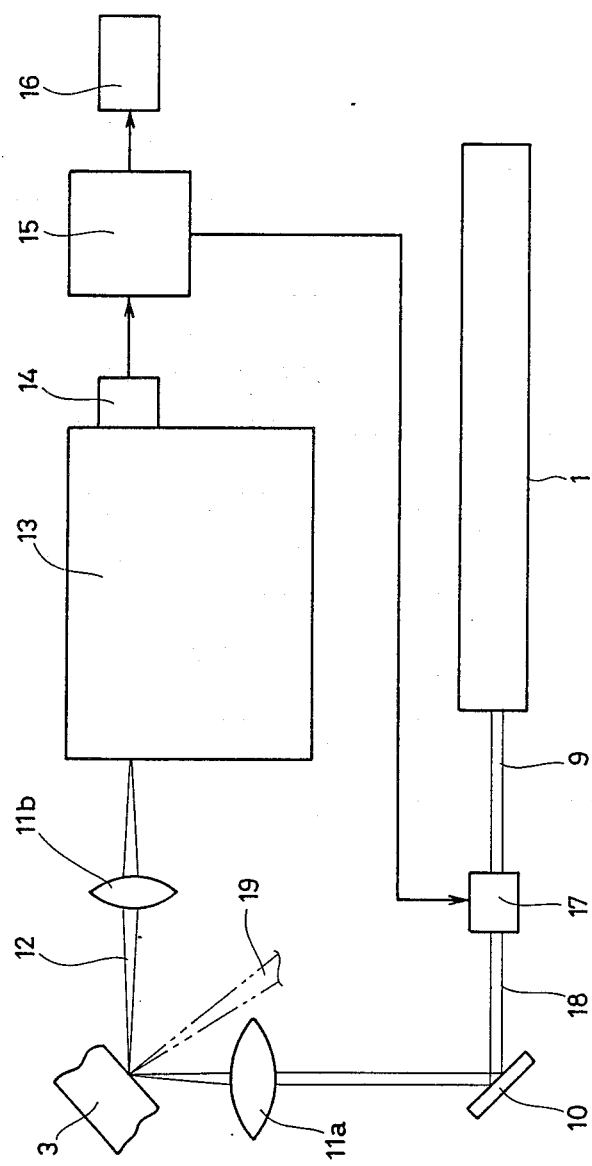
FIG. 8 is a schematic block diagram showing exemplary structure of the stress evaluation apparatus according to the present invention.

FIG. 8 is a schematic block diagram showing exemplary structure of a stress evaluation apparatus based on the general block diagram as shown in FIG. 7.

Referring to FIG. 8, excitation light 9 supplied from a light source 1 is reflected by a mirror 10, and converged by a lens 11a on a measuring point of a substance 3 to be evaluated. Scattered light 12 from the measuring point is converged by an another lens 11b, and spectro-analyzed by a spectroscope 13. Spectro-analyzed light is detected by a detector 14, inputted in a microcomputer 15 and transmitted to a recorder 16.

Figure 5:
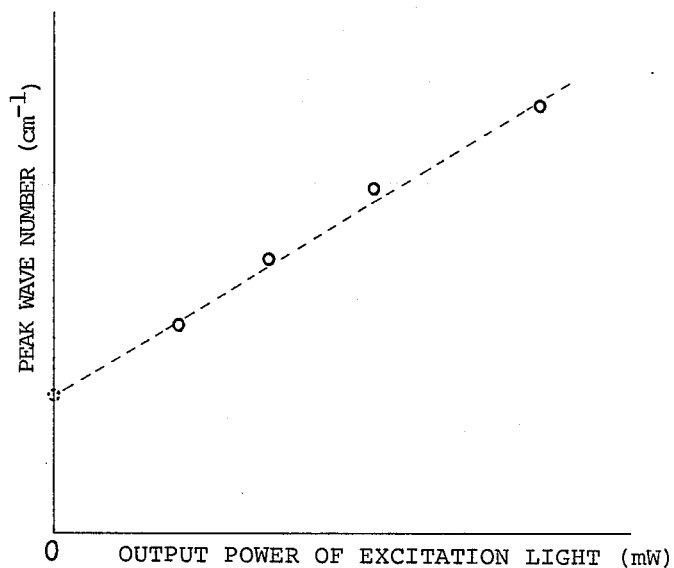
FIG. 5 illustrates dependency of peak wave number of Raman spectrum on output power of excitation light.
Figure 6:
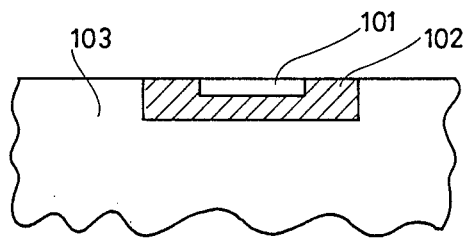
FIG. 6 is a sectional view showing a substance being in structure varied in temperature change with irradiation of excitation light.

In the aforementioned stress evaluation apparatus, the output power of the excitation light 9 supplied from the light source 1 is controlled by an output controller 17. The excitation light 18 thus controlled in output power is changed in direction by the mirror 10 and focused by the lens 11a, to be converged on/applied to the measuring point of the evaluated substance 3. The scattered light 12 from the evaluated substance 3 is focused by the lens 11b, to be incident on a slit of the spectroscope 13 and spectro-analyzed. The Raman spectrum of the spectro-analyzed light is detected by the detector 14 and converted into an electric signal, to be stored in the microcomputer 15. Thus, a Raman spectrum is measured with respect to a measuring point. The output power of the excitation light 9 is changed by the output controller 17, in order to measure a plurality of Raman spectra corresponding to different output power of the excitation light per measuring point. In this embodiment, the microcomputer 15 supplies indication for output change of the excitation light 9 to the output controller 17. The plurality of Raman spectra thus measured are stored as electric signals in the microcomputer 15. The electric signals are analyzed in order to obtain peak wave numbers of the respective Raman spectra. Thereafter the respective peak wave numbers corresponding to the output power of the excitation light are statistically processed as shown in FIG. 5. Relation between the output change of the excitation light and the variation in peak wave number is decided through a regression line or spline function as shown in FIG. 5 per measuring point of the evaluated substance. A peak wave number at a prescribed reference value is obtained per measuring point through the decided relation, as data for stress evaluation/comparison between measuring points. In this embodiment, a peak wave number at an excitation light output power of 0 mW is obtained through extrapolation, as shown in FIG. 5. The aforementioned statistic processing and arithmetic are performed in the microcomputer 15, so that the results thereof are transferred to the recorder 16 to be recorded therein.

Figure 9:
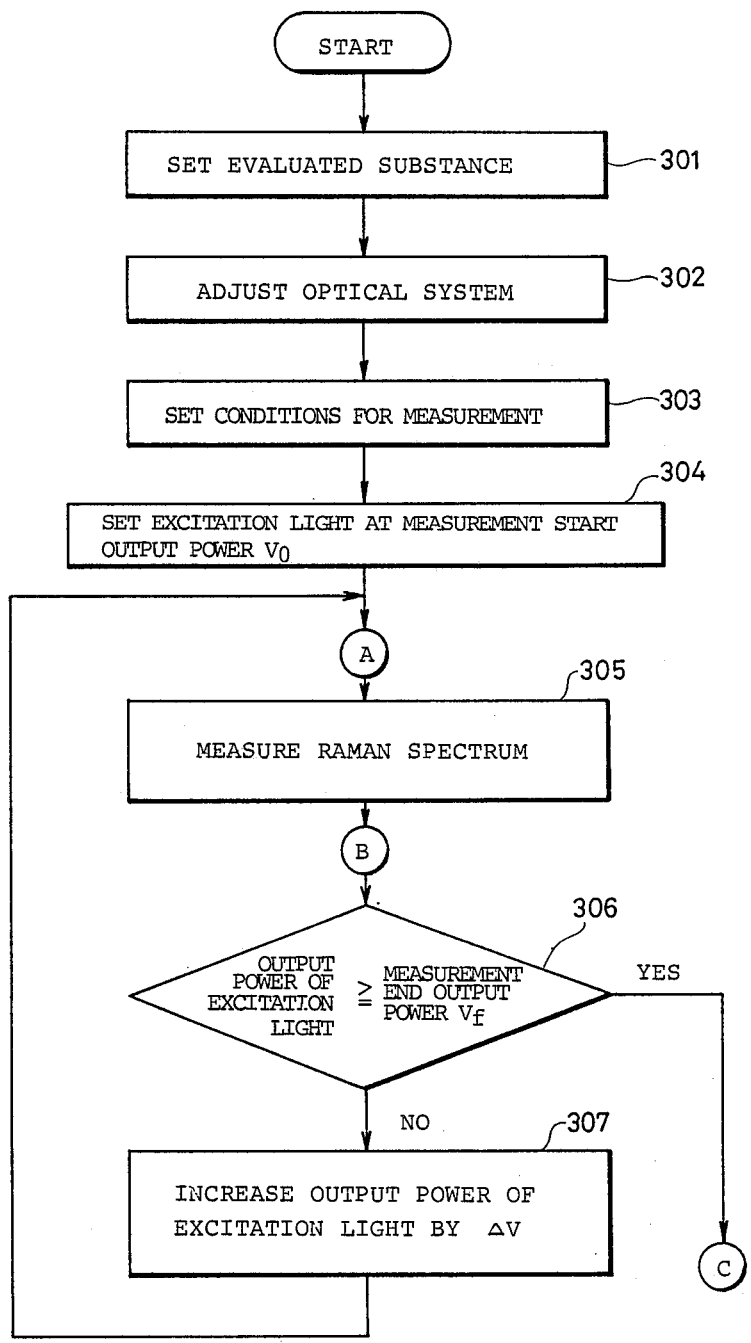
FIGS. 9 and 10A are flow charts showing Raman spectrum measurement processing through the inventive apparatus.
Figure 10A:
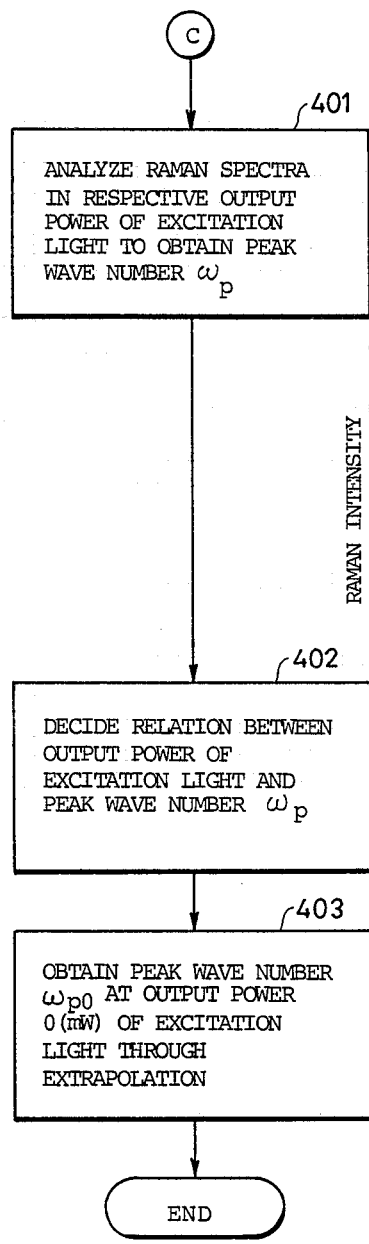

Description is now made on Raman spectrum measurement through the aforementioned inventive stress evaluation apparatus, with reference to flow charts. FIGS. 9 and 10A are flow charts showing Raman spectrum measurement processing in the apparatus according to the present invention.

Figure 1:
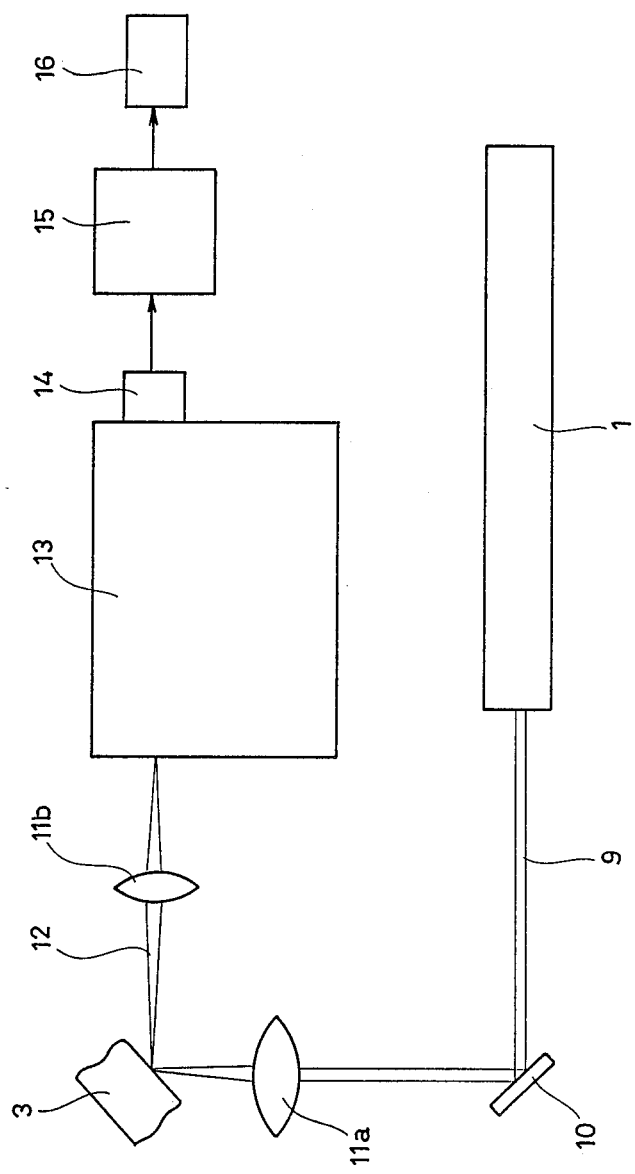
FIG. 1 is a schematic block diagram showing a conventional stress evaluation apparatus.
Figure 2:
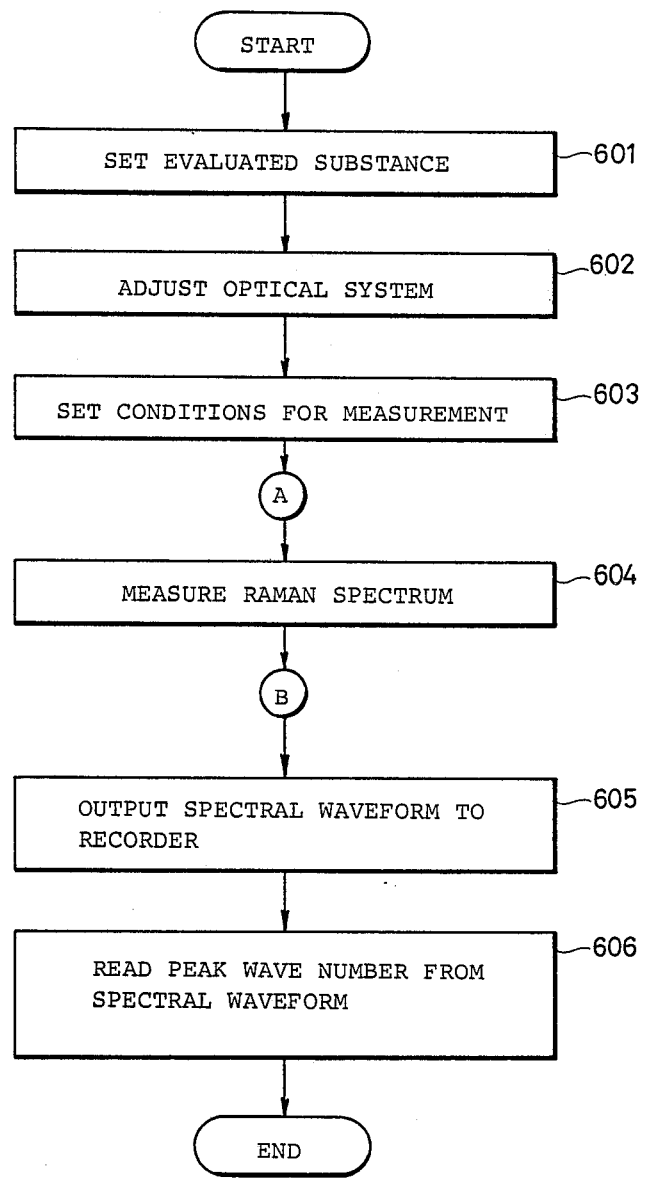
FIG. 2 is a flow chart showing Raman spectrum measurement processing through the conventional stress evaluation apparatus.
Figure 3:
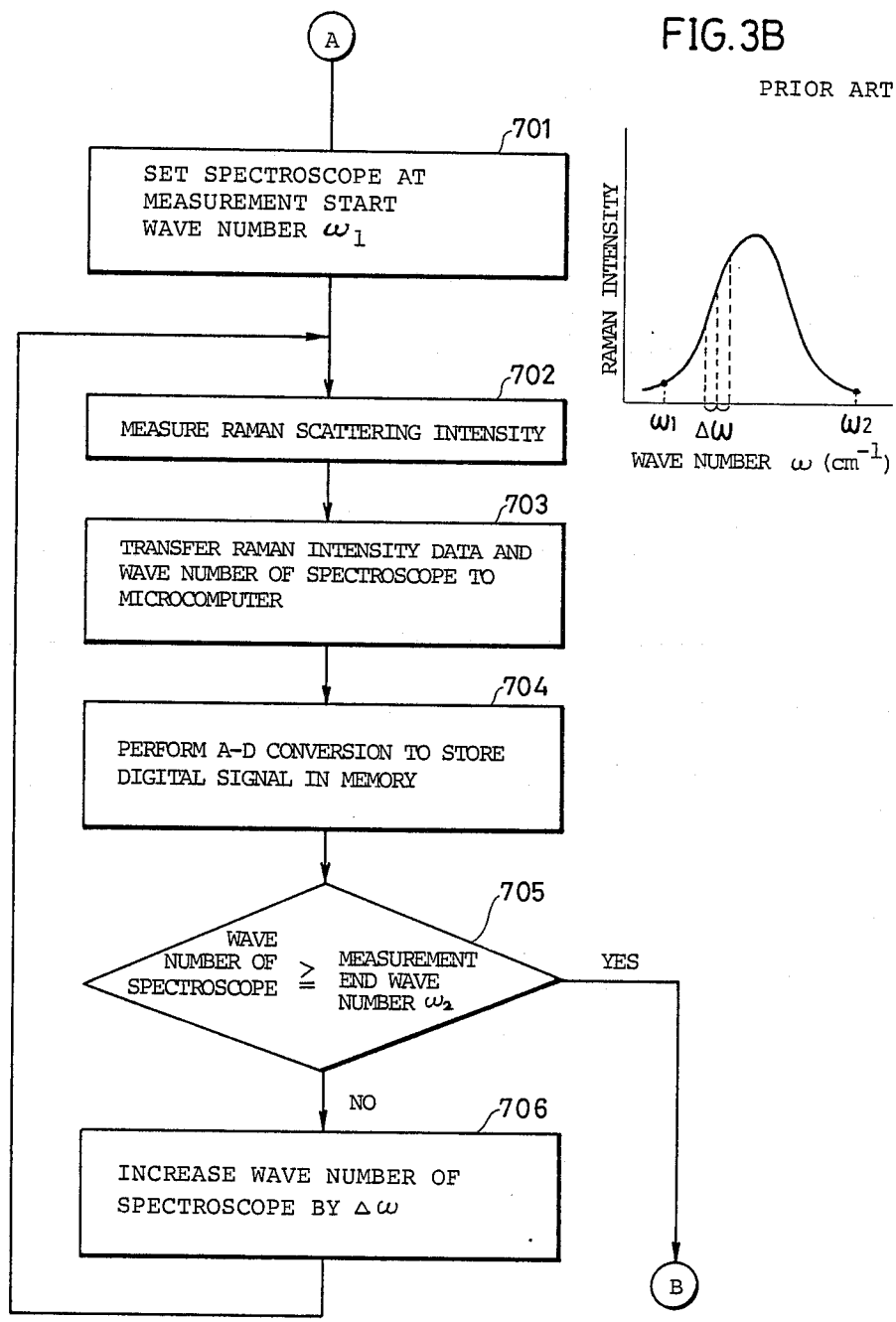
FIG. 3A is a flow chart showing a Raman spectrum measurement routine.
FIG. 3B is a diagram for illustrating FIG. 3A.
Figure 4:
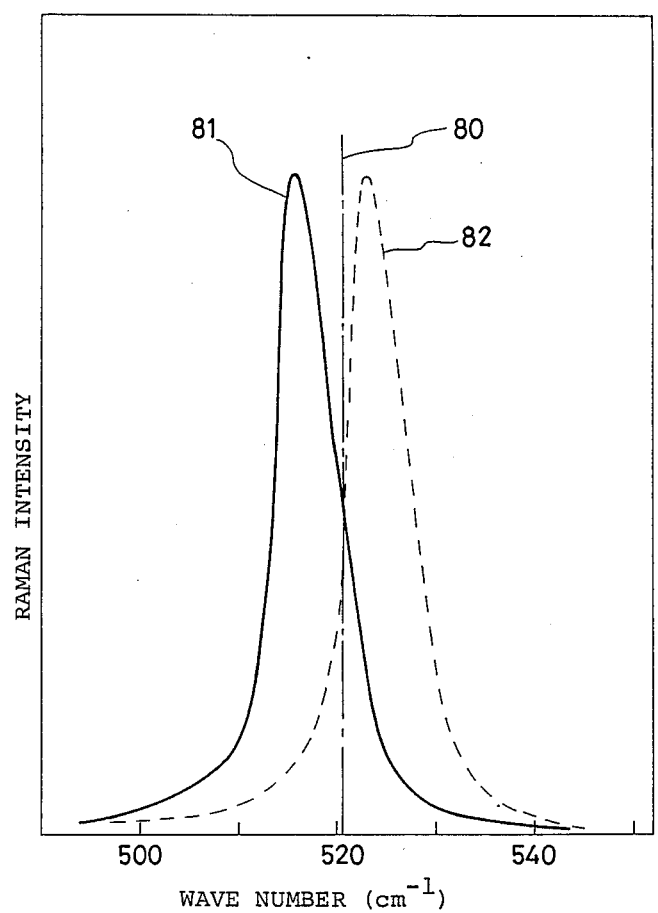
FIG. 4 illustrates variation in peak wave number of Raman spectra caused by stress existing in substance.
Figure 10B:
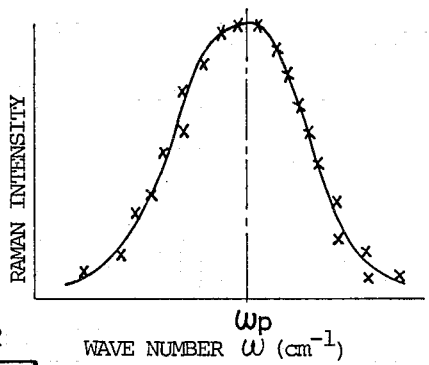
FIGS. 10B and 10C are diagrams for illustrating FIG. 10A.
Figure 10C:
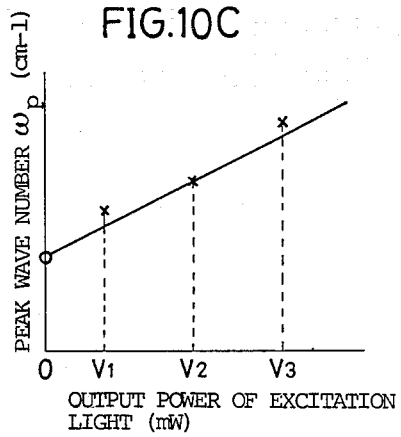

First, a substance to be evaluated is set with reference to a step 301 and an optical system including lenses, mirror etc. is adjusted at a step 302 while conditions for Raman spectrum measurement are set at a step 303. Then, excitation light is set at a measurement start output power $V_0$ at a step 304. Then the Raman spectrum is measured at a step 305 along the aforementioned spectrum measurement routine as shown in FIG. 3A. Completion of this processing means that the Raman spectrum corresponding to an output power of the excitation light is measured in a given measuring point. With reference to a step 306, the output power of the excitation light is compared with a measurement end output power $V_f$, so that the output power of the excitation light is increased by $\Delta V$ at a step 307 if the same is smaller than the measurement end output power $V_f$. Measurement of Raman spectra corresponding to respective output power is repeated until the output power of the excitation light exceeds the measurement end output power $V_f$, so that the Raman spectra are stored in a memory of a microcomputer as digital signals. When the output power of the excitation light exceeds the measurement end output power $V_f$, the process is advanced to processing as shown in FIG. 10A. At a step 401, the Raman spectrum data at respective output power of the excitation light, being stored in the memory, are analyzed to obtain a peak wave number $\omega_P$ as shown in FIG. 10B. In this embodiment, Lorentz fitting is performed on respective Raman intensity data shown by symbol x in FIG. 10B, in order to obtain the peak wave number $\omega_P$ from the parameter of an optimum Lorentzian line. At a step 402, the peak wave number $\omega_P$ thus obtained is statistically processed in correspondence to each output power of the excitation light, to decide relation between the same. For example, an optimum regression line is obtained by a method of least squares as shown in FIG. 10C. Referring to a step 403, the regression line as shown in FIG. 10C is extrapolated thereby to obtain a peak wave number $\omega_{P0}$ at an output power 0 mW of the excitation light.

Thus, the peak wave number of a measuring point is obtained to serve as data to be compared. All of the above processing can be realized by the microcomputer.

Although the output controller 17 is employed upon emission of the excitation light in order to control the output power of the excitation light in the aforementioned embodiment, the output power of the light source 1 may be controlled in place. Further, although the temperature at the measuring point of the evaluated substance 3 is changed by controlling the output power of the excitation light through the output controller 17, light other than the excitation light, such as heating light 19, may be externally applied to the evaluated substance 3 in order to change the temperature of the measuring point. In addition, the light source is not restricted to a laser beam source, but may be formed by any other light source so far as the same is suitable for Raman spectrum observation. Needless to say, the inventive apparatus is not restricted to evaluation of semiconductor, but may be applied to evaluation of various other substances. Further, the arithmetic may be performed through a method other than the extrapolation as shown in the embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A stress evaluation apparatus for evaluating stress existing in a substance by difference between peak wave numbers of Raman spectra of scattered light, said stress evaluation apparatus comprising:
    a light source for emitting excitation light;
    an entrance optical system for guiding said excitation light to measuring points of a substance to be evaluated;
    a scatter optical system for focusing scattered light from said measuring points;
    scattered light measuring means for measuring peak wave numbers in Raman spectra of said scattered light;
    temperature change means for changing temperatures of said measuring points;
    statistic processing means for statistically processing a plurality of measured values of a peak wave number varied with temperature change of each said measuring point per said measuring point; and
    arithmetic means for deciding relation between temperature change of said measuring points and variation in peak wave number on the basis of statistic values calculated by said statistic processing means thereby to obtain a peak wave number at a prescribed reference value.

2. A stress evaluation apparatus in accordance with claim 1, wherein said temperature change means includes means for changing said temperatures of said measuring points by controlling the output power of said excitation light applied on said measuring points.

3. A stress evaluation apparatus in accordance with claim 1, wherein said temperature change means includes means for changing temperatures of said measuring points by applying light other than said excitation light applied on said substance to be evaluated.

4. A stress evaluation apparatus in accordance with claim 1, wherein said arithmetic means performs arithmetic through extrapolation.

5. A stress evaluation apparatus in accordance with claim 1, wherein said scattered light measuring means includes spectro-analyzing means for spectro-analyzing said scattered light, detecting means for detecting Raman spectra of spectro-analyzed said scattered light and analyzing means for analyzing detected said Raman spectra.

6. A stress evaluation apparatus in accordance with claim 1, wherein said light source is a laser beam source.

7. A stress evaluation apparatus in accordance with claim 1, wherein said substance to be evaluated is semiconductor.

* * * * *